US 7,662,359 B2

(12) United States Patent
Karvinen et al.

(10) Patent No.: US 7,662,359 B2
(45) Date of Patent: Feb. 16, 2010

(54) TITANIUM OXIDE PRODUCT METHOD FOR MAKING THE SAME AND ITS USE AS A PHOTOCATALYST

(75) Inventors: Saila Mariatta Karvinen, Pori (FI); Ralf-Johan Lamminmäki, Vanha-Ulvila (FI)

(73) Assignee: Sachtleben Pigments Oy, Helsinki (FI)

( * ) Notice: Subject to any disclaimer, the term of this patent is extended or adjusted under 35 U.S.C. 154(b) by 183 days.

(21) Appl. No.: 10/588,216

(22) PCT Filed: Feb. 4, 2005

(86) PCT No.: PCT/FI2005/000074

§ 371 (c)(1),
(2), (4) Date: Aug. 2, 2006

(87) PCT Pub. No.: WO2005/075354

PCT Pub. Date: Aug. 18, 2005

(65) Prior Publication Data

US 2007/0173405 A1    Jul. 26, 2007

(30) Foreign Application Priority Data

Feb. 6, 2004    (FI) .................................. 20040186

(51) Int. Cl.
*C01G 23/047* (2006.01)
*C01G 23/053* (2006.01)
*C01G 23/08* (2006.01)
*B01J 21/00* (2006.01)
*B01J 21/06* (2006.01)

(52) U.S. Cl. ...................... 423/610; 502/350
(58) Field of Classification Search ................ 423/610; 502/350
See application file for complete search history.

(56) References Cited

U.S. PATENT DOCUMENTS 3,329,484 A    7/1967    Long et al.

(Continued)

FOREIGN PATENT DOCUMENTS

EP    0 376 216 A1    7/1990

(Continued)

OTHER PUBLICATIONS

Song, J.S., et al., "Redox Abilities of Rutile $TiO_2$ Ultrafine Powder in Aqueous Solutions", *Metals and Materials International*, vol. 8, No. 1, pp. 103-109, (2002).

(Continued)

*Primary Examiner*—Timothy C Vanoy
*Assistant Examiner*—Serena L Hanor
(74) *Attorney, Agent, or Firm*—The Nath Law Group (57) ABSTRACT

The invention relates to a process for manufacturing a particulate titanium dioxide product, wherein hydrated titanium dioxide is precipitated from an aqueous solution of titanium oxychloride by adding to the solution titanium dioxide particles as crystal nuclei and the product obtained from the precipitation step is isolated and optionally calcined. The process is characterized by the addition of crystal nuclei to an aqueous solution of titanium oxychloride having a content of >90 g $TiO_2$/l calculated as $TiO_2$ and the performance of precipitation at a temperature below the boiling point of the said aqueous solution and at normal pressure. In addition, the invention relates to a titanium dioxide product prepared by using the process, the use of the product as a photocatalyst, and a photocatalyst, which comprises a titanium dioxide product prepared according to the invention.

36 Claims, 2 Drawing Sheets

U.S. PATENT DOCUMENTS

| | | | |
|---|---|---|---|
| 3,549,322 A | 12/1970 | Klein et al. | |
| 4,923,682 A | 5/1990 | Roberts et al. | |
| 4,944,936 A | 7/1990 | Lawhorne | |
| 5,024,827 A | 6/1991 | Jones et al. | |
| 6,001,326 A | 12/1999 | Kim et al. | |
| 2004/0092393 A1* | 5/2004 | Bygott et al. | 502/350 |

FOREIGN PATENT DOCUMENTS

| | | |
|---|---|---|
| EP | 0 505 022 A1 | 9/1992 |
| EP | 1 095 908 A1 | 5/2001 |
| EP | 1 178 011 A1 | 2/2002 |
| EP | 1 205 243 A1 | 5/2002 |
| KR | 2001025628 A | 4/2001 |
| KR | 2002078637 A | 10/2002 |
| KR | 2002083652 A | 11/2002 |

OTHER PUBLICATIONS

Li, Y., et al., "A novel method for preparation of nanocrystalline rutile $TiO_2$ powders by liquid hydrolysis of $TiCL_4$,", *J. Mater. Chem.*, vol. 12, pp. 1387-1390, (2002).

Roméas, Virginie, et al., "Testing the Efficacy and the Potential Effect on Indoor Air Quality of a Transparent Self-Cleaning $TiO_2$-Coated Glass through the Degradation of a Fluoranthene Layer", Ind. Eng. Chem. Res., 1999, pp. 3878-3885, vol. 38, No. 10, American Chemical Society.

* cited by examiner

TITANIUM OXIDE PRODUCT METHOD FOR MAKING THE SAME AND ITS USE AS A PHOTOCATALYST

The present invention relates to a process for the production of a titanium dioxide product, a product prepared by using the process, the use, as a photocatalyst, of the titanium dioxide product manufactured by using the process, a process for the production of a photocatalyst, as well as a photocatalyst, which comprises titanium dioxide prepared by using the process of the invention.

PRIOR ART

Due to its chemical inertness and non-toxic nature, the photocatalytic $TiO_2$ is a very interesting raw material for practical catalyst systems.

$TiO_2$ can exist in three different crystal forms. Rutile is the stable form at higher temperatures. Anatase is the predominant form at lower temperatures. At lower temperatures, also the brookite form may exist, which is usually found among minerals showing an ortrhombic crystal form. Both rutile and anatase belong to a tetragonal crystal system. For example, $TiO_2$, which is manufactured for the production of paints, is almost exclusively of the rutile form. It is commonly understood that the anatase form of $TiO_2$ is photocatalytically more active than the other crystal forms. Also, a good photocatalytic activity has been obtained with a mixture of anatase and rutile.

The factors affecting the photocatalytic reaction include, among others, the specific surface of catalyst particles, porosity, and water adsorbed onto surfaces, as well as surface hydroxyl groups. Photocatalytically, it is advantageous if the crystal size of titanium dioxide is small and its specific surface is large. These requirements are fulfilled more often for anatase than for rutile, since anatase in known to be the predominant form at lower temperatures, where the crystal size is smaller. In addition, anatase absorbs water and hydroxyl groups to its surface to a higher extent than rutile. As it is well known, the preparation of mixtures of anatase and rutile is more easy than pure rutile. The calcination of titanium dioxide in anatase form in the presence of so called rutilizing chemicals, such as, for example, zinc, results, even at lower temperatures, in the generation of a mixture of anatase and rutile.

Typically, the marketed photocatalytic titanium dioxides are of anatase form or of a mixture of rutile and anatase, and are active within the UV-region, so that their activation requires, as a light source, UV bulb or sunlight, of which only 3-5% of the radiation reaching the earth can be exploited.

EP 1 095 908 describes titanium dioxide, which has been characterized by determining, among others, spin concentration by employing an ESR spectrum (electron spin-resonance spectrum) and which is intended for use as a photocatalyst mainly within the visible region of light. As an example of the production process there is mentioned mixing titanium compound in acid and precipitation with a base, for example, ammonium, and calcination of the formed titanium hydroxide.

U.S. Pat. No. 6,001,326 describes a process for producing monodisperse and crystalline titanium dioxide ($TiO_2$), wherein, according to the patent, a preferred titanyl chloride solution is produced, which makes possible the spontaneous precipitation of titanium dioxide out of the solution and thus also the control of the production of rutile and anatase form, among others, by the temperature and the length of precipitation. The process comprises of an initial preparation of a solution of 1.5 M titanium oxychloride, which is then diluted with water to 0.2-1.2 M, after which the precipitation of titanium dioxide out of solution is left to proceed spontaneously, without the addition of nucleating crystals, for example, at 15-70° C. to obtain the rutile form, or at 70-155° C. to enrich the anatase form. In the description of the prior art, that patent refers generally to the use of titanium dioxide, among others, as a photocatalyst or pigment, but there is no mention of any photocatalytic activity possessed by the products prepared by the described process.

Song et al., in their publication in Metals and Materials Intern. 8(1), 2002, pp. 103-109, have prepared, analogously to Kim et al (U.S. Pat. No. 6,001,326) rutile at 50° C. from a titanium oxychloride solution, having a concentration of $TiO_2$ of 32-56 g/l. According to this publication the action of the rutile in question was better than that of a commercial P-25 $TiO_2$ (Degussa Co.) in a photocatalytic reaction carried out using UV light in an aqueous solution of 4-chlorophenol or Cu-, Pb-EDTA.

According to Li et al. (J. Mater. Chem. 12 (2002) 1387), rutile is produced in aqueous solution of titanium tetrachloride at any concentration at a temperature below 50° C., and predominantly anatase is produced at temperatures exceeding 80° C. irrespective of the use of nucleating crystals. The hydrolysis reactions described by these authors are slow. They have obtained from a titanium oxychloride solution, which was obtained by hydrolyzing titanium tetrachloride in an aqueous solution (0.28 mol/l $TiCl_4$ corresponds to 22.4 g/l $TiO_2$) at a temperature of 95° C., during their precipitation with rutile nuclei, mostly anatase and only 35.5% rutile. According to this publication, nanorutile can be used, for example, as a UV absorbing agent in cosmetic products, pigments and plastics.

In U.S. Pat. No. 4,944,936, hydrated titanium dioxide in rutile form has been produced from a solution of titanium oxychloride with titanium dioxide nuclei by performing the precipitation at the boiling point of the aqueous solution and calcining the obtained product at 600-1100° C. According to this patent the object of the process has been to obtain a maximally narrow particle size distribution. However, at high calcination temperatures, the crystal size tends to grow and the specific surface to diminish.

EP 0 505 022 describes a process, which produces a titanium dioxide which is preferred for use in pigments. In the process, titanium dioxide crystal nuclei are added to an aqueous solution of titanic halide and the precipitation is performed in a closed vessel under pressure at a temperature of 150-300° C. In addition, the mixture is subjected to ultrasonic treatment during heating in order to improve pigmentary properties. According to the patent, rutile or anatase can be employed as crystal nuclei according to the desired form to be obtained. As it is known, high temperature and pressure are preferred for the formation of pigmentary titanium dioxide particles.

Catalysts within the visible region of light have been prepared by doping anatase with nitrogen or transition metals. There is, however, still need for efficient catalysts within the visible region of light suitable for industrial production. Furthermore, there is a need for a photocatalyst having a better performance, particularly for indoor use and for public and industrial spaces where fluorescent illumination is used.

THE OBJECT OF THE INVENTION

The object of the present invention is to provide a photocatalyst with excellent performance, which operates within the UV region and is preferably efficient also within the visible region of light.

Further, an object of the present invention is to provide a process for the preparation of titanium dioxide product, which is very useful as a photocatalyst, wherein easily obtainable and low-cost starting materials and simple process steps can be used. Further, there is provided a titanium dioxide product prepared by using this process.

DESCRIPTION OF THE INVENTION

In the process of the invention for the production of particulate titanium dioxide product, hydrated titanium dioxide (TiO$_2$xH$_2$O) is precipitated from an aqueous solution of titanium oxychloride by adding to the solution titanium dioxide particles as nucleating crystals. The process is characterized by the addition of the nucleating crystals to an aqueous solution of titanium oxychloride, having a content of more than 90 g TiO$_2$ in one litre of solution, calculated as titanium dioxide, and by performing the precipitation step at a temperature below the boiling point of the solution and at a normal pressure.

For the hydrated titanium dioxide, the common name titanium dioxide is also used, as usually known in the art.

Further, by normal pressure is meant herein ambient pressure, i.e., the precipitation step is not performed under pressure.

It has now been found, that during the precipitation of titanium dioxide from an aqueous solution of titanium oxychloride by using the conditions of the invention and the addition of nucleating crystals, a photocatalytically very active titanium dioxide product is surprisingly obtained. Further, by using the process, a titanium dioxide product which is photocatalytically active also within the visible region of light can be obtained. The precipitation conditions of the invention, as defined in the characterizing part of claim 1, and the addition of titanium dioxide nucleating crystals, produce titanium dioxide particles which have an unexpectedly advantageous structure having influence on the photocatalytic activity.

Further, under the conditions of the invention, i.e., at the said concentration of the aqueous solution of the titanium dioxide and at a normal pressure, the temperature below the boiling point can be varied without substantially affecting the crystal form of the precipitating product. It was found that, under these conditions, the addition of nucleating crystals is sufficient to drive the crystal form of the precipitating product primarily towards rutile. Even also in the presence of sulphate ions, surprisingly because sulphate is known to drive precipitation towards the anatase form.

In addition, it was found that the precipitation is driven towards rutile irrespectively of the form of the nucleating crystal used.

The observations made are unexpected since according to the prior art, the form of the precipitating crystal, i.e., the formation of anatase or rutile, is substantially affected by the temperature of precipitation and/or possibly by the form of the added crystal nuclei.

By the process of the invention there can be produced, for example, as compared to spontaneous precipitation, rutile with small-sized crystals at a temperature higher than 70° C., so that the photoactivity of the product and preferably the photoactivity within the visible region of light is enhanced.

The aqueous solution of titanium oxychloride used for the precipitation of the invention can be prepared by any method known in the art, for example, from a commercial titanium tetrachloride and water. The starting materials, such as titanium tetrachloride, can be purified free of possible contaminants as needed.

The process of the invention employs titanium oxychloride solutions with contents of over 90 g, such as 91 g, of TiO$_2$ in one litre of solution, calculated as titanium dioxide. According to a preferred embodiment, the content of the aqueous solution of titanium oxychloride to be precipitated is 95-300 g of TiO$_2$/l, preferably 100-250 g TiO$_2$/l, more preferably 150-230 g of TiO$_2$/l. Without the addition of crystal nuclei, an aqueous solution of titanium oxychloride with a TiO$_2$ strength of 200 g/l would not precipitate hydrated titanium dioxide within a reasonable time. Of course, diluting with water and making the amount of the added crystal nuclei larger speed up the rate of precipitation.

The solution of titanium oxychloride formed in the instant invention does not need further dilution with water in the precipitation step, whereby the water economy of the processes is improved.

During the precipitation step, particulate titanium dioxide is added as crystal nuclei to solution of titanium dioxide, whereby, due to this addition, the crystal form of the precipitating product is driven under the conditions of the invention to a photocatalytically preferred direction. Furthermore, it was found that during the precipitation step of the invention the amount of added crystal nuclei can also be varied in order to adjust the photoactivity of the product considering the various needs in end use applications. Thus, titanium dioxide particles can be added for example at 0.5-10% by weight, preferably at 1-7% by weight, more preferably at 1.5-5% by weight, such as at 2-5% by weight based on the calculated total titanium content of the titanium oxychloride solution expressed as TiO$_2$, depending on the desired photocatalytic activity for the finished product. Preferably, the particles are added as a suspension, for example, an aqueous suspension, to the solution to be precipitated. The content of the suspension with respect to TiO$_2$ may be for example 5-100 g/l, preferably 10-80 g/l, more preferably 10-50 g/l, such as 15-40 g/l. The average crystal size (the average diameter) of the added nuclei is preferably in the range of 1-15 nm, for example 5-15 nm, as measured for example by X-ray diffraction method.

Accordingly, the nucleating crystals used in the precipitation may be for example in rutile form or in anatase form and these may be prepared by using methods described in the literature. The rutile nuclei can be prepared, for example, by peptizing a sodium titanate solution with hydrochloric acid, and anatase nuclei by hydrolyzing a TiOSO$_4$ solution (Barksdale J., Titanium, its occurrence, chemistry, and technology, The Ronald Press Company, New York, 1949, p. 160 and p. 253). Preferably, as crystal nuclei in excess of 20% in rutile are used.

Further, according to the invention, the temperature of the precipitated solution during the entire precipitation step is below the boiling point of the solution, preferably between 50-100° C., more preferably between 60 and below 100° C., still more preferably 70-98° C. By raising the precipitation temperature within the limits of the invention, the precipitation yield per unit time can be enhanced. Hereby also the treatability of the titanium oxychloride solution with respect to the evaporating chloride fumes is enhanced. According to a preferred embodiment, the precipitation step is carried out in the temperature range of 89-95° C.

Of course, the length of precipitation depends on the concentration used in the aqueous solution, on the precipitation temperature and on the amount of added crystal nuclei. As a preferred example, 1-24 h, preferably 2-10 h, for example 2-5 h, should be mentioned.

The acidic precipitate obtained from the precipitation step is separated from the solution, whereby the precipitated product is typically filtered off and washed in a manner known in the art. Thus, washing allows the minimization of residual chlorides and cations in the product.

Preferably, the precipitated product, which after isolation is in the form of hydrated titanium dioxide, is further neutralized to pH 6-10, preferably pH 7-9, more preferably pH 7-8. The neutralization is performed by using a base, such as sodium hydroxide or ammonia. The neutralization has again an advantageous influence on the catalytic properties of the final product, so as it may allow the enhancement of $CO_2$ conversion, if needed, and/or diminution of the percentage of the intermediates formed during the decomposition. The isolated and optionally neutralized product is optionally dried. The drying can be performed at a temperature that can vary between the ambient temperature and 500° C., preferably at 100-500° C., more preferably at 100-300° C., still more preferably at 100-250° C. The length of drying can be 0.5-5 h, for example 1-3 h.

In a preferred embodiment of the invention, the product prepared by using the process is calcined in a manner known in the art by employing for example an oven, because of the unexpected finding that also calcination has further advantageous effects on the properties of the product, among others, on the crystal size and/or the crystal structure. According to an embodiment an especially preferred photocatalytic activity is obtained for the precipitated product by calcining the product and performing the calcinations at a lower temperature, which can vary between the ambient temperature and a temperature below 700° C., preferably between 100-500° C., more preferably between 150-400° C., for example 150-300° C. The length of calcinations can be 0.5-5 h, preferably 1-3 h. The calcination step, like the precipitation step, is also not performed under pressurized conditions but under normal pressure.

The precipitated and optionally neutralized product may then be subjected separately to a drying and/or calcination step or these are employed as a one and the same step. In an embodiment the drying and calcination is a one and the same step.

As it is known in the art, the precipitated titanium dioxide product containing water of crystallization (hydrated titanium dioxide) gives off water.

The crystal size of the product of the invention can be varied within the limits of the process. The crystal size can be grown, among others, by using a calcination step. Preferably, the average diameter of the precipitated crystals may vary in a range not exceeding 50 nm, for example, 1-50 nm, preferably 5-30 nm, more preferably 5-20 nm, for example 5-15 nm. During calcination, the crystals may also agglomerate and they can be subjected to grinding as needed to obtain the desired particle size. The determination of the size can be performed, for example, by X-ray diffraction method.

Further, by the process of the invention there can be obtained a photocatalytically active titanium dioxide product, specific surface of which can vary, for example, in the range of 10-500 $m^2/g$, preferably 10-300 $m^2/g$, more preferably 15-200 $m^2/g$, such as 15-100 $m^2/g$, depending on, among others, the precipitation conditions, the calcination temperature, and/or the addition of sulphate. The specific surface of the product of the invention can be determined, for example, by means of nitrogen absorption using the known BET technique.

Due to the process of the invention, it is possible to produce a product having a photocatalytically very active crystal structure, and, furthermore, the process conditions can be varied in order to modify the photocatalytic properties of the product precipitated within the limits of the invention, for example, to obtain a product which has an efficient photocatalytic action within the UV region and which is also a substantially active photocatalyst within the visible region of light.

Thus, the invention further provides a titanium dioxide product prepared by using the process, which has an excellent porous structure with a photocatalytic activity. Particularly preferably the prepared $TiO_2$ product has a structure with a substantially better activity within the visible region of light than that prepared by processes known in the prior art.

According to a preferred embodiment, there is produced a titanium dioxide product, wherein the crystal form is primarily rutile, preferably over 70%, more preferably over 80%, yet more preferably over 90%, in rutile.

Further, in the precipitation step of the process of the invention, there can be added also other substances and compounds following the known practice with respect to photocatalysts, for example nitrogen or sulphur, or a metal, such as iron, chromium or cobalt, in order to modify the properties of the precipitated product. According to a preferred embodiment, the specific surface of the precipitated titanium dioxide product is grown by adding sulphate either as a sulphate salt (as a solution or as a solid) or as sulphuric acid (as a solution) to the titanium oxychloride solution to be precipitated. Sulphate can be added for example at 1-5% by weight, preferably at 1-3% by weight. The addition of sulphate was found to retard precipitation, like lowering the precipitation temperature. At the same time, the specific surface of the product grew.

For the formation of crystals during the precipitation step of the instant invention neither any temperatures exceeding the boiling point of the solution to be precipitated nor any pressure are used, but the crystals are precipitated at a temperature below the boiling point of the solution and at a normal pressure, and the hydrated titanium dioxide formed after the isolation, such as filtration and washing, as well as an optional neutralization, is preferably calcined as described above, whereby the formation of crystals can be controlled in two steps. In an embodiment the calcination is performed at temperatures mentioned above, preferably below a temperature of 400° C., such as 200-300° C.

Typically, the product of the invention can convert harmful gases, for example formaldehyde, acetaldehyde and/or toluene, into carbon dioxide. Preferably, by using a measurement time of 1 hour and 15 minutes and a xenon bulb as a light source and a light filter at 385 nm (corresponding to daylight) in a measuring arrangement of FIG. 1, described in the Examples section, the conversion into carbon dioxide can be typically over 70%, for example 70-90%, preferably up to 100%.

Further, the invention provides the use of the titanium dioxide product produced according to the invention as a photocatalyst, preferably as a photocatalyst at least within the UV region, more preferably within the UV region and the visible region of light.

According to an embodiment, the product produced according to the invention can be used for the photocatalytic purification of air and water, preferably for the purification of indoor air, such as indoor spaces open to public or indoor spaces in private surroundings, to remove harmful gases, for example formaldehyde, acetaldehyde, or toluene in buildings and cars.

Further, the product can be used in self-cleaning coatings.

Further, there is provided a photocatalyst, which comprises, as a photocatalyst component, the titanium dioxide product produced according to the invention. The photocatalyst can comprise the product produced according to the invention as a sole catalyst component or in addition one or more other photocatalytically active agents and optionally one or more supports suitable for a photocatalyst, preferably an inert support.

Further, there is provided a manufacturing process for a photocatalyst, wherein the titanium dioxide prepared according to the invention is further formulated into a form of a photocatalyst composition in a manner known in the art. The photocatalytic hydrated titanium dioxide prepared according to the invention can, for example, be ground into a powder or mixed into a coating slurry, for example, for a coating process. Thus the photocatalyst can exist in the form of a powder or coating. The coating can be composed of, for example, known coating mixtures useful in indoor spaces, into which mixtures the product of the invention and optionally other photocatalytically active agents or inert supports are added.

The invention also provides a process for producing a coated product, wherein one or more surfaces of the product is coated at least in part with a photocatalyst prepared according to the invention. Furthermore, there is provided a product, such as a wall or a window, the surface of which is coated at least in part with the said photocatalyst, for example a photocatalyst coating.

The invention is illustrated with reference to the following Examples section. Unless otherwise stated, the starting materials and materials are commercially available products or these can be prepared by prior art techniques. The crystal nuclei were prepared as described above in the Description section.

EXAMPLES

Figure 2:
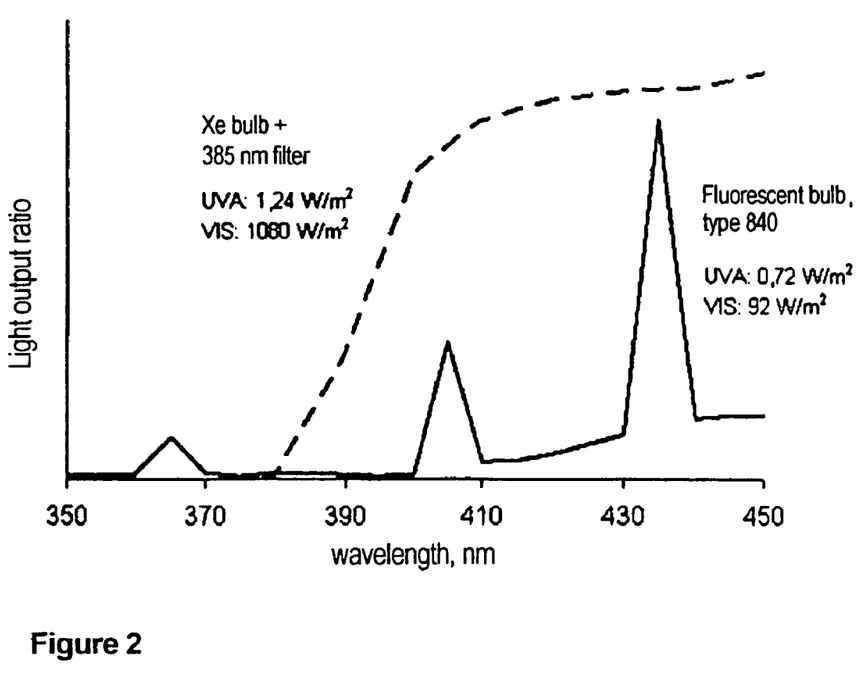
FIG. 2 shows excitation spectra of a fluorescent bulb (light output ratio, near-UV: 0.72 W/m$^2$, VIS: 92 W/m$^2$) within the UV region and visible region of light (VIS), (shown as a continuous line in the plot), respectively, and the spectrum of a xenon bulb (light output ratio: near UV: 1.24 W/m$^2$, VIS: 1080 W/m$^2$) cut off by using a 385 nm filter (shown as a dotted line in the plot).

The activity of the photocatalytic product of the invention can be assessed by decomposing aldehyde and toluene simultaneously in the gaseous phase. The assays are typically aimed to reflect maximally natural conditions. Actually, the air is never "clean and dry". It always contains water vapour, carbon dioxide and solid particles. In the assay, the air at room temperature and at normal pressure can be adjusted to an initial content of 400 ppm carbon dioxide and to a content of 10,000 ppm water. The decomposition of organic compounds and the generation of carbon dioxide can be monitored by a FTIR spectrometer. The titanium dioxide sample is ground in a mortar and mixed with water to form a slurry. The slurry is poured onto a Petri plate such that the $TiO_2$-content on the plate is 10 g/m². The Petri plate is placed in an oven at a temperature of 60° C. over night. As light sources there can be used, for example, a 300 W xenon bulb with a light filter at 385 nm, or a fluorescent bulb Dulux F 24W/830. The fluorescent bulb in question, which is used in the assay, is used commonly in buildings open to the public. The illumination obtained with the xenon bulb equipped with a light filter at 385 nm can be thought to reflect daylight illumination. Typical excitation spectra are shown in FIG. 2.

Figure 1:
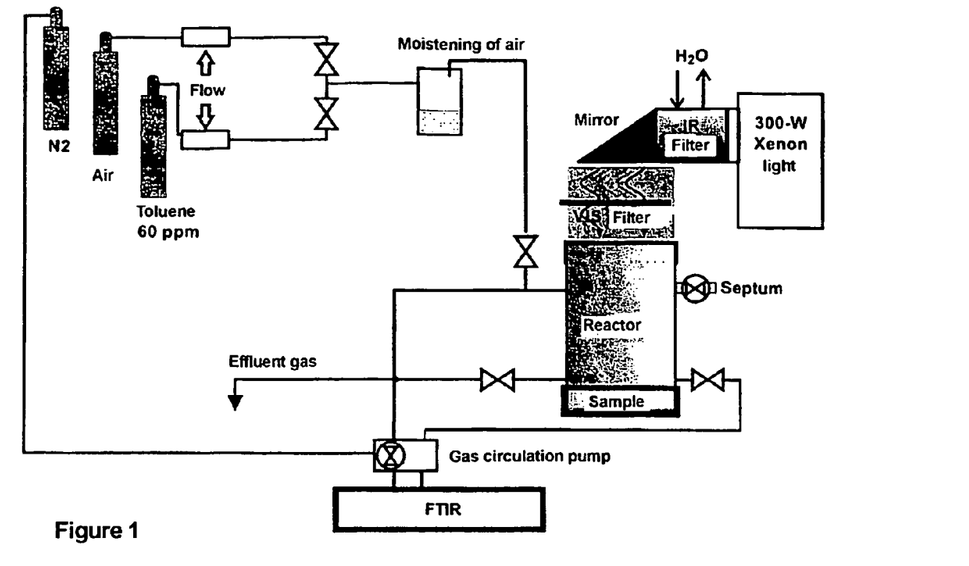
FIG. 1 shows the equipment used for assaying the photoactivity in the context of the invention.

The measuring equipment used is shown in FIG. 1.

Initially, air containing water and carbon dioxide was directed into the equipment. After the equilibration of the $CO_2$ and $H_2O$ contents, the aldehyde (1 µl in a 25% aqueous solution) and toluene (0.2 µl) were added and after the equilibration of these contents the desired bulb was switched on. The length of the illumination was 1 hour and 15 minutes and the reactor was finally flushed with synthetic air.

The average rate of the formation of $CO_2$ was calculated based on the total amount of carbon dioxide formed. The rates of decomposition of acetaldehyde and toluene were fitted into a first order reaction kinetics equation as calculated on the basis of the removal of acetaldehyde and toluene from the gaseous phase. The results are expressed as relative figures. In view of the catalytic activity, the efficiency of carbon dioxide formation is one of the most important variables, so that its value was regarded as a measure of the photocatalytic efficiency in the experiments performed.

Example 1

Photocatalytic hydrated titanium dioxide was prepared by precipitating from a volume of 500 ml of titanium oxychloride solution (236 g/l $TiO_2$ and 330 g/l HCl) with rutile nuclei ($TiO_2$ 30 g/l), added at 3%, as calculated on the basis of $TiO_2$. The mixture was stirred for three hours at 80° C., whereby the yield of hydrated $TiO_2$ was 98.3%. The acidic precipitate formed was filtered off and washed with excess of water. The acidic precipitate obtained was then neutralized with ammonia (200-400 g/l) to a pH of 6, and the mixture stirred for half an hour. The precipitate was filtered and washed with warm distilled water. The precipitate was dried in air at 200° C. for one hour.

The rutile content of the product was more than 99.5% in rutile based on powder X-ray diffraction measurement. The crystal size of rutile was measured on the basis of the broadening of the peak of the X-ray diffraction pattern of rutile by using the Scherrer equation. The obtained crystal size was 10 nm. The specific surface was determined by the BET-technique on the basis of nitrogen absorption to be 126 m²/g.

In a photoactivity assay, the product converted the starting materials totally into carbon dioxide within the measurement period (one hour and 15 minutes). The relative rate of formation of carbon dioxide was 205 ppm/h by using the 385 nm filter and the decomposition rate of aldehyde −10.7 and the decomposition rate of toluene −1.6.

Example 2

Photocatalytic hydrated titanium dioxide was prepared as in Example 1. However, the obtained precipitate was calcined at various temperatures for one hour. The temperatures chosen were 300° C., 400° C., 500° C., and 700° C. The measured properties and the photoactivity results are shown in Table 1.

Example 3

Photocatalytic hydrated titanium dioxide (5000 ml) was precipitated from a solution of titanium oxychloride ($TiO_2$ 208.5 g/l) with nuclei ($TiO_2$ 30 g/l), which were added at 2% calculated on the basis of $TiO_2$. The mixture was stirred for three hours at 90° C., whereby the yield of $TiO_2$ was 96%. To the slurry was added 3 l of water and after the settling of the precipitate the overflow was discarded. Then, the precipitate was filtered off and washed with excess of water. The acidic precipitate was then neutralized with sodium hydroxide to pH 8 and the mixture was stirred for half an hour. The precipitate was filtered and washed with warm distilled water. The precipitate was dried at 270° C. for four hours and the measured pH was 9.9. The measured properties and photoactivity results are shown in Table 1.

Example 4

Photocatalytic hydrated titanium dioxide was precipitated from a volume of 5000 ml of a solution of titanium oxychloride ($TiO_2$ 214.5 g/l) with nuclei ($TiO_2$ 30 g/l), which were added at 1.5% calculated on the basis of $TiO_2$. The mixture was stirred for three hours and 45 minutes at 90° C., whereby the yield of $TiO_2$ was 94.2%. To the slurry was added 3 l of water and after the settling of the precipitate the overflow was discarded. Then, the precipitate was filtered off and washed with excess of water. Thereafter, the acidic precipitate was neutralized with sodium hydroxide to pH 10 and the mixture was stirred for half an hour. The precipitate was filtered and washed with warm distilled water. The precipitate was dried at 200° C. for one hour. The measured properties and photoactivity results are shown in Table 1.

Example 5

The photocatalytic hydrated titanium dioxide was precipitated as in Example 1, but anatase nuclei were substituted for rutile nuclei. The length of precipitation was four hours and the yield 94.2%. The precipitate was neutralized and dried as in Example 1.

The rutile content of the product was in excess of 79% in rutile on the basis of powder X-ray diffraction measurement. The other measured properties and photoactivity results are shown in Table 1.

Example 6

The photocatalytic hydrated titanium dioxide was precipitated as in Example 1, but at the precipitation temperature of 70° C. The length of the precipitation was two hours and the yield 92.5%. The precipitate was neutralized as in Example 1 and dried at 300° C. for one hour.

The rutile content of the product was in excess of 99.5% in rutile on the basis of powder X-ray diffraction measurement. The other measured properties and photoactivity results are shown in Table 1.

Example 7

Photocatalytic hydrated titanium dioxide (700 ml) was precipitated from a solution of titanium oxychloride ($TiO_2$ 194 g/l) with nuclei ($TiO_2$ 30 g/l), which were added at 5% calculated on the basis of $TiO_2$. The mixture was stirred for two hours at 95° C., whereby the yield of $TiO_2$ was 96.8%. The precipitate was filtered off and washed with five litres of water. Thereafter, the acidic precipitate was neutralized with sodium hydroxide to pH 7 and the mixture was stirred for half an hour at 40° C. The precipitate was filtered and washed with warm distilled water. The precipitate was dried at 200° C. for one hour and the pH according to the measurement, was 8.1.

The rutile content of the product was in excess of 99.5% rutile on the basis of powder X-ray diffraction measurement. The product converted the starting materials to $CO_2$ to an extent of 90% during the measuring period of the photoactivity assay. Other measured properties and photoactivity results are shown in Table 1.

Example 8

Photocatalytic hydrated titanium dioxide (700 ml) was precipitated from the solution of titanium oxychloride ($TiO_2$ 194 g/l), to which was added 3% $SO_4^{2-}$ as sodium sulphate (200 g/l, Merck pro analysi) with nuclei ($TiO_2$ 30 g/l), which were added at 4% calculated on the basis on $TiO_2$. The mixture was stirred for two hours at 95° C., whereby the yield of $TiO_2$ was 97.5%. The precipitate was filtered off and washed with five litres of water. Thereafter, the acidic precipitate was neutralized with sodium hydroxide to pH 7 and the mixture was stirred for half an hour at 40° C. The precipitate was filtered and washed with warm distilled water. The precipitate was dried at 200° C. for one hour and the pH was measured, and this was 7.9.

The rutile content of the product was in excess of 99.5% in rutile on the basis of powder X-ray diffraction measurement. The sulphur content of the product was measured to be 0.37%. Other measured properties and photoactivity results are shown in Table 1.

Example 9

Photocatalytic hydrated titanium dioxide (700 ml) was precipitated from the solution of titanium oxychloride ($TiO_2$ 194 g/l), to which was added 5% $SO_4^{2-}$ sulphuric acid solution (200 g/l, Merck pro analysi), with rutile nuclei ($TiO_2$ 30 g/l), which were added at 4% calculated on the basis on $TiO_2$. The mixture was stirred for two hours at 95° C., whereby the yield of $TiO_2$ was 95.5%. The precipitate was filtered off and washed with five litres of water. Thereafter, the acidic precipitate was neutralized with sodium hydroxide to pH 7 and the mixture was stirred for half an hour at 40° C. The precipitate was filtered and washed with warm distilled water. The precipitate was dried at 200° C. for one hour and the pH was measured, and this was 7.4.

The rutile content of the product was in excess of 88.5% in rutile on the basis of powder X-ray diffraction measurement. The sulphur content of the product was measured to be 0.67%. Other measured properties and photoactivity results are shown in Table 1.

Reference Example 1

Metals and Materials 2002 p. 103

Initially, $TiCl_4$ was diluted with water so that the strength of the solution calculated as the concentration of $TiO_2$ was 56 g/l. The solution was warmed to 50° C. and stirred at that temperature for 4 hours. The yield was 94.6%. The precipitate was filtered off and washed with 1.7 litres of water. The cake was then neutralized to pH 7 by adding sodium hydroxide. Finally, the precipitate was filtered and washed with water and calcined at 200° C.

The rutile content of the product was in excess of 88.5% in rutile on the basis of powder X-ray diffraction measurement. Other measured properties and photoactivity results are shown in Table 1.

Comparative Example 2

According to EP-0,444,789, Example 10

As starting materials in the production of rutile with small-sized crystals were used a solution of titanium tetrachloride in hydrochloric acid (200 g/l $TiO_2$ and 345 g/l HCl) and a solution of sodium carbonate (250 g/l). To the bottom of a precipitation flask with a capacity of two litres, 638 ml of $Na_2CO_3$ and 12 ml of water are introduced. The three-necked flask is equipped with a stirrer in the middle port and the other ports are equipped with a thermometer and an addition funnel for titanium oxychloride. The stirrer was switched on and the solution warmed to 40° C. To this solution is slowly added 350 ml of titanium oxychloride. During this step the solution was not warmed, but only stirred. After the addition of titanium oxychloride was completed, the slurry contained 90 g/l $TiO_2$ and the measured concentration of hydrochloric acid was 10 g/l. The temperature was slowly increased to 80° C. and the mixture was stirred at that temperature for 30 min. Finally, sodium hydroxide was added to the mixture so that the pH rose to 4.5. The precipitate was filtered off and washed with water.

The calcination was performed at a temperature of 200° C. for one hour. The product was 99.5% in rutile. In the photoactivity assay the product converted the starting materials to 38% carbon dioxide during the measurement period. Other measured properties and photoactivity results are shown in Table 1.

Reference Example 3

A commercial photocatalytic product Degussa P25, which is a mixture of anatase and rutile. The measured properties and photoactivity results are shown in Table 1.

Reference Example 4

Nitrogen-doped anatase product (0.15% N). The measured properties and photoactivity results are shown in Table 1.

TABLE 1

Figures obtained with products and photoactivity results by using a xenon bulb and a light filter at 385 nm

| Ex. | Precipitation t(° C.) | nuclei* | $SO_4^{2-}$ | Calcination t (° C.) | Specific surface $m^2/g$ | Crystal size nm* | $CO_2$ produced ppm/h | Decomposition of aldehyde | Decomposition of toluene |
|---|---|---|---|---|---|---|---|---|---|
| 1 | 80 | 3% r | — | 200 | 126 | 10 r | 205 | 10.7 | 1.6 |
| 2 | 80 | 3% r | — | 300 | 50 | 17 r | 128 | 5.0 | 0.7 |
| 2 | 80 | 3% r | — | 400 | 32 | 22 r | 76 | 6.3 | 0.3 |
| 2 | 80 | 3% r | — | 500 | 21 | 35 r | 23 | 1.0 | 0.1 |
| 2 | 80 | 3% r | — | 700 | 11 | 62 r | 12 | 0.1 | 0.1 |
| 3 | 90 | 2% r | — | 270 | 47 | 16 r | 150 | 6.9 | 0.9 |
| 4 | 90 | 1.5% r | — | 200 | 67 | 12 r | 189 | 4.9 | 1.0 |
| 5 | 80 | 3% a | — | 200 | 202 | 10 a 9 r | 107 | 3.0 | 1.3 |
| 6 | 70 | 3% r | — | 300 | 35 | 20 r | 34 | 1.2 | 0.7 |
| 7 | 95 | 5% r | — | 200 | 123 | 9 r | 152 | 13 | 1.3 |
| 8 | 95 | 4% r | 3% | 200 | 134 | 9 r | 178 | 18 | 3.1 |
| 9 | 95 | 4% r | 5% | 200 | 150 | 6 a 8 r | 129 | 8.9 | 2.1 |
| ref1 | 50 | 0 | — | 200 | 145 | 7 r | 130 | 9.3 | 1.2 |
| ref2 | 80 | 0 | | 200 | 111 | 12 r | 63 | 4.4 | 0.3 |
| ref3 anat + rut | | | | | 50 | 21 a 14 r | 45 | 9.7 | 0.5 |
| ref4 N-dop. | | | | | 110 | 13 a | 37 | 2.1 | 0.5 |

*r rutile form and a anatase form

Decomposition of aldehyde (1 μl in a 25% aqueous solution) and toluene (0.2 μl) by the product of the invention resulted in the relative rate of formation of carbon dioxide of at least 130 ppm/h and in the relative decomposition rates for aldehyde and toluene of over 10 and 1.5, respectively, using the 385 filter. Preferably, the relative rate of the formation of carbon dioxide was at least 160 ppm/h and the relative decomposition rates for aldehyde and toluene were over 15 and 2.5, respectively, using the 385 filter.

Further, as compared to commercially available products with anatase-rutile mixtures or nitrogen-doped anatase, the product of the instant invention is over 100%, preferably over 150% and most preferably over 250% more efficient photocatalyst in the conversion of toluene and aldehyde into carbon dioxide, as measured by using a xenon bulb and light passing a light filter at 385 nm.

Example 10

Application Experiment

Into each test tube filled with water were weighed, respectively, equal amounts of the product of Example 8, nitrogen-doped anatase, and a commercial anatase-rutile mixture. A drop of methylene blue was placed into each test tube. As a light source, a kitchen light (L 18 W-835 white super, Oy Airam AB) was used. The product of Example 8 decomposed methylene blue in a completely different manner as compared to the other samples. The blue test tube cleared in the case of Example 8 and the blue colour disappeared totally. In contrast, the other test tubes remained blue.

Example 11

Application Experiment 7.5 g of the product of Example 1, 16.9 g of an aqueous dispersion of $SiO_2$ (30%, Ludox) and 20.8 g of ethanol were weighed out. The materials were mixed together, and the laquer was applied by brushing onto a metal plate as a photocatalytic surface.

Example 12

The product of the invention was clearly at least 50% more efficient than the commercial anatase-rutile mixture products or nitrogen-doped anatase when assayed for photoactivity using a fluorescent bulb Osram Dulux® F 24W/830 as a light source.

The advantage of the present invention over the prior art processes is that an industrially more advantageous solution of titanium oxychloride with a lower water content, and an industrially more advantageous length of precipitation can be used. Moreover, the use of nuclei enhances safety. Furthermore, the combination of the given strength of precipitation solution, the use of nuclei, and the precipitation temperature below the boiling point can provide the precipitation of rutile with a clearly more efficient photocatalytic activity, which activity can be advantageously exploited also for indoor illumination conditions.

The invention claimed is:

1. A process for manufacturing a particulate titanium dioxide product, comprising:
   providing an aqueous solution of titanium oxychloride having a content of >90 g $TiO_2$/l calculated as $TiO_2$;
   adding an amount of sulphate in the range of 1 to 5% by weight, calculated on the basis of the amount of $TiO_2$ in the solution, into the aqueous solution of titanium oxychloride;
   adding titanium dioxide particles as crystal nuclei to the aqueous solution of titanium oxychloride;
   precipitating hydrated titanium dioxide particles at a temperature of 50 to 100° C., the temperature being below the boiling point of the aqueous solution of titanium oxychloride and at normal pressure to obtain a precipitated hydrated titanium dioxide product;
   calcining the precipitated hydrated titanium dioxide product at a temperature of 100 to 500° C. to obtain a titanium dioxide product is comprised of more than 70% rutile in a crystal form.

2. The process according to claim 1, wherein the content of the aqueous solution of titanium oxychloride is 95 to 300 grams of $TiO_2$ per liter of aqueous solution.

3. The process of according to claim 1, wherein the titanium dioxide particles are added in an amount of 0.5 to 10% by weight, calculated on the basis of the total titanium content in the solution of titanium oxychloride and expressed as $TiO_2$.

4. The process according to claim 1, wherein the titanium dioxide particles are added as a suspension having an amount of 5 to 100 g/l of $TiO_2$.

5. The process according to claim 1, wherein the average particle size of the titanium dioxide particles is from 1 to 15 nm.

6. The process according to claim 1, wherein the titanium dioxide particles are of a rutile and/or anatase crystal form.

7. The process according to claim 1, wherein the precipitation step is carried out at a temperature between from 60° C. to below 100° C.

8. The process according to claim 1, wherein the precipitated titanium dioxide product is washed and neutralized with a base to a pH range in a range of from 6 to 10.

9. The process according to claim 1, wherein the calcination is performed at a temperature in a range of from 150 to 400° C.

10. The process according to claim 1, wherein titanium dioxide product comprises crystals having an average diameter of less than 50 nm.

11. The process according to claim 1, wherein the titanium dioxide product has a specific surface area in the range of from 10 to 500 m²/g.

12. The process according to claim 1, wherein the titanium dioxide product is comprised of more than 80% rutile in a crystal form.

13. The process according to claim 12 wherein the titanium dioxide product has activity in the UV region of light.

14. The process according to claim 13, wherein the titanium dioxide product has activity in a visible region of light.

15. The process according to claim 1, wherein the titanium dioxide product is a photocatalytically active titanium dioxide product.

16. The process according to claim 1, wherein the content of the aqueous solution of titanium oxychloride is 100 to 250 grams of $TiO_2$ per liter of aqueous solution.

17. The process according to claim 1, wherein the content of the aqueous solution of titanium oxychloride is 150 to 230 grams of $TiO_2$ per liter of aqueous solution.

18. The process of according to claim 1, wherein the titanium dioxide particles are added in amount of 1 to 7% by weight, calculated on the basis of the total titanium content in the solution of titanium oxychloride and expressed as $TiO_2$.

19. The process of according to claim 1, wherein the titanium dioxide particles are added in an amount 1.5 to 5% by weight, calculated on the basis of the total titanium content in the solution of titanium oxychloride and expressed as $TiO_2$.

20. The process of according to claim 1, wherein the titanium dioxide particles are added at 2 to 5% by weight, calculated on the basis of the total titanium content in the solution of titanium oxychloride and expressed as $TiO_2$.

21. The process according to claim 1, wherein the titanium dioxide particles are added as a suspension having an amount of 10 to 80 g/l of $TiO_2$.

22. The process according to claim 1, wherein the titanium dioxide particles are added as a suspension having an amount of 10 to 50 g/l of $TiO_2$.

23. The process according to claim 1, wherein the titanium dioxide particles are added as an aqueous suspension having an amount of 10 to 100 g/l of $TiO_2$.

24. The process according to claim 1, wherein the titanium dioxide particles are added as an aqueous suspension having an amount of 10 to 80 g/l of $TiO_2$.

25. The process according to claim 1, wherein the titanium dioxide particles are added as an aqueous suspension having an amount of 10 to 50 g/l of $TiO_2$.

26. The process according to claim 1, wherein the average particle size of the titanium dioxide particles is from 5 to 15 nm.

27. The process according to claim 1, wherein more than 20% of the titanium dioxide are in rutile form.

28. The process according to claim 1, wherein the precipitation step is carried out at a temperature between from 70 to 98° C.

29. The process according to claim 1, wherein the precipitated titanium dioxide product is washed and neutralized with a base to a pH in a range of from 7 to 9.

30. The process according to claim 1, wherein the titanium dioxide product comprises crystals having an average diameter in a range of from 5 to 30 nm.

31. The process according to claim 1, wherein the titanium dioxide product comprises crystals having an average diameter in a range of from 5 to 20 nm.

32. The process according to claim 1, wherein the titanium dioxide product has a specific surface area in the range of from 10 to 300 m$^2$/g.

33. The process according to claim 1, wherein the titanium dioxide product is comprised of more than 90% rutile in a crystal form.

34. The process according to claim 1, wherein the sulphate is an acid or a salt.

35. A photocatalyst, which comprises titanium dioxide product prepared by a process according to claim 1.

36. A product, which has a surface coated at least in part with a photocatalyst coating, which comprises the titanium dioxide product prepared by the process according to claim 1.

* * * * *